Dec. 10, 1929.  H. J. MURRAY  1,738,788
MULTIPLE DISK SYNCHRONIZER
Filed Aug. 6, 1925
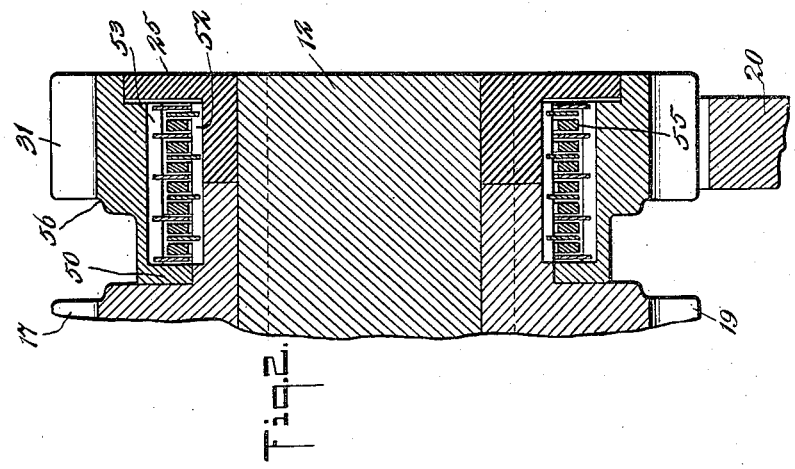
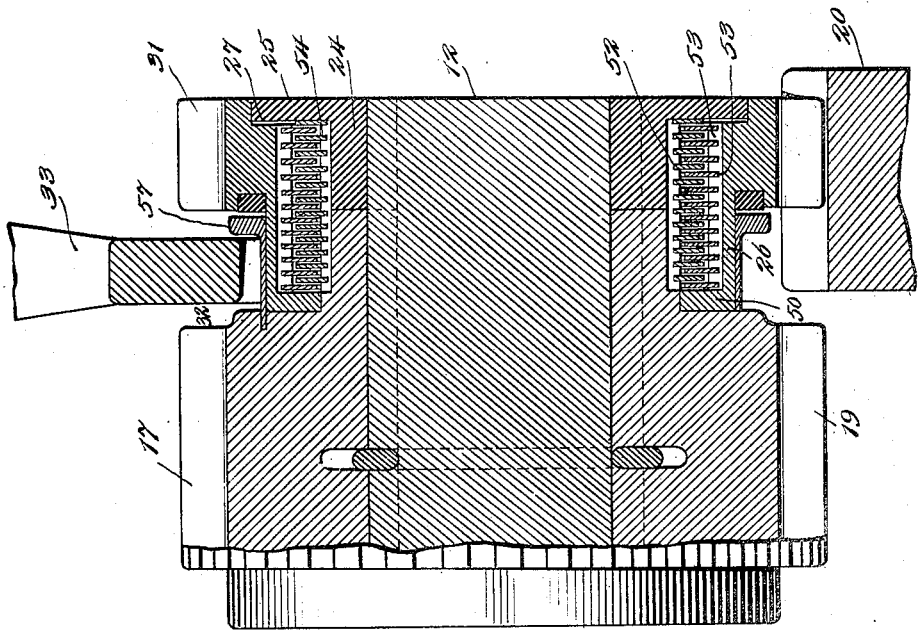
INVENTOR
*Howard J. Murray*
BY
*Warren S. Orton.*
ATTORNEY Patented Dec. 10, 1929

1,738,788

UNITED STATES PATENT OFFICE

HOWARD J. MURRAY, OF BROOKLYN, NEW YORK, ASSIGNOR TO R. M. COMPANY, INC., OF EAST PITTSBURGH, PENNSYLVANIA, A CORPORATION OF DELAWARE

MULTIPLE-DISK SYNCHRONIZER

Application filed August 6, 1925. Serial No. 48,559.

The invention relates in general to a variable speed power transmission mechanism of the gear shift type and in which the power driven gear and the load carrying gear are coordinated through the interposition of a friction clutch so that the gears will tend to assume a speed of rotation approximately equal to each other before the power gears are moved into their intermeshed position.

The present invention is a further development of the construction shown in my copending application, S. N. 748,237, sliding clutch gear synchronizer, which discloses an intermediate gear, identified as a synchronizer gear, rotatably mounted on one of the power gears and meshing with the other gear and in which a single friction surface provides the friction clutching effect between the axially shiftable synchronizer gear and the power gear on which it is mounted. The invention also constitutes a development of the multiple friction surface form of clutching connections disclosed in my co-pending application, S. N. 601,689, filed November 18, 1922, double clutch synchronizer.

As was the case in the invention disclosed in application Serial No. 601,689, the present disclosure also has for a general object the providing of a simple form of gear synchronizer and particularly the providing of an improved form of friction clutch for such synchronizers by means of which the minimizing of the relative speeds is made much more effective with less manual effort than is necessary with the single or double face type forms of synchronizer clutches disclosed in the above identified applications.

The primary object of the present invention is to provide an extremely sensitive form of gear synchronizer and the providing of a form of synchronizer which can be actuated with slight manual force and in which the gears to be synchronized can be brought to synchronizing speed almost instantaneously and without shock.

Broadly, I attain this improved operation by providing a form of clutch which is characterized by a large number of independently movable clutching faces.

Such a construction obviously requires for its housing more space than is possible with the forms of modified gears in the transmissions shown in the above identified applications, and accordingly, another object of the invention is to provide a form of shiftable gear unit which will contain the multiple disk type of friction clutch herein featured and which at the same time will provide the maximum area of clutching surface within the relatively narrow confines apportioned to the shiftable gear element in automotive vehicle transmission sets now in general use.

Various other objects and advantages of the invention will be in part obvious from an inspection of the accompanying drawings and in part will be more fully set forth in the following particular description of one form of device embodying my invention, and the invention also consists in certain new and novel features of construction and combination of parts hereinafter set forth and claimed.

In the accompanying drawings:—

Figure 1 is a fragmentary view of parts of two of the power gears of the type found in transmission casing of conventional form, equipped with a preferred embodiment of the inventive features disclosed in this and in the above identified applications; and Figure 2 is a similar view of a slightly modified form of the invention.

In the following description and in the claims, parts will be identified by specific names for convenience of expression but they are intended to be as generic in their application to similar parts as the art will permit.

In the drawings and referring to either figure there is shown a power shaft 12 which for the purpose of this disclosure may be considered as a propeller shaft operatively connected to drive the traction wheels of an automobile. A gear unit 17 is keyed to the shaft so as to rotate therewith and is shiftable axially thereon as is usual in such constructions. The shiftable unit includes a power gear 19 designed to mesh with a gear 20 keyed to another shaft not shown and which may be the jack shaft of a multiple speed transmission gear set. In this disclosure it is assumed that it is desired to synchronize the gears 19 and 20. The shiftable gear 19 is provided with a hub sleeve extension 24 on the outer end of which is shrunk a stop plate 25 provided on its inner side with a radially extending bearing face 27 designed to constitute the fixed clutch jaw of the friction clutch constituting the novel feature of this disclosure.

The synchronizing device includes a synchronizing gear 31 having one end rotatably mounted upon the stop member 25 and provided with a hub 26 provided at its inner end adjacent the gear 19 with an inturned flange 50 constituting the movable jaw of the multiple disk friction clutch 51 positioned between the same and the fixed jaw face 27. The hub extension 24 is provided on its outer face with a longitudinally extending locking keyway 52 and similarly the inner face of the gear 31 and its hub extension 26 is similarly provided with a locking keyway 53 facing the keyway 52.

It is a feature of this disclosure that the friction members are in the form of disks 54 preferably metal disks and in the preferred construction the largest number of disks are used that can be accommodated within the space available. In the illustrated showing the clutch projects beyond the inner outline of the synchronizing gear and into the space beneath the groove 32 which is positioned between the gears 19 and 31 to accommodate the usual shift fork 33 commonly found in change speed transmissions now in general use.

In the form of the invention shown in Figure 2 the clutch members are in the form of metal disks with each alternate disk secured to one of the gears by means of the slot 52 and the other disks therebetween similarly secured to the other gear by means of the slot 53. In this case the disks are designed to engage with each other flatwise and it is intended that the disks be designed so as to provide the maximum area of interengaging friction surface. It is understood from this construction that the synchronizer gear is free to have a limited axial movement on the power gear on which it is mounted, and that the several disks or equivalent friction elements forming the clutch similarly have a limited freedom of axial movement but are secured to their associated gears so as to rotate therewith.

In the form of the invention shown in Figure 2 friction rings 55 are disposed between adjacent pairs of the friction members which are secured to the gears, but these friction rings are not connected to either gear and are thus free to rotate. It is suggested that these friction rings be of a material different from the material of which the disk friction members are formed and it is herein suggested that they be made of bakelite, cork, or other material usual in providing for friction creating surfaces.

It is suggested that the clutch be moved into operative position either by the direct engagement of the shift fork 33 against a shoulder 56 forming one side of the gear synchronizers 31 as shown in Figure 2 or the shift fork 33 may be caused to engage a similar face of an actuator or camming ring 57 for causing the momentum of the gear unit 17 to affect the axial shifting of the synchronizer as is more fully disclosed in my co-pending applications Serial Nos. 614,502, filed January 23, 1923, and 633,610, filed April 21, 1923.

In operation and assuming that the manual moving of the shifting fork to the right of the showing in the drawings acts either directly or through the interposition of the camming ring 57 to shift the synchronizer gears to the right, this movement of the fork will cause the flange 50 to engage and bear against one end of the set of friction disks. A continued movement of the shift fork will provide a successive clutching effect between each succeeding adjacent set of friction faces until the entire set of disks are shifted axially and into clutching engagement with the fixed jaw provided by the stop member 25. There will thus be effected a frictional clutching of the synchronizer gear to the power gear on which it is mounted through the agency of the clutch causing one of the power gears to assume the speed of the other. The continuation of pressure by the further actuation of the shift fork will cause the sliding gear unit to move bodily on its carrying shaft and finally effect a meshing of the two power gears as has been more fully described in the above identified co-pending application.

Under some conditions of operation it is desirable to have the synchronizer gear 31 free of the gear 20 just prior to the movement of the gear 19 into mesh with the gear 20 and for this reason, gear 20 in the showing in Figure 2 is of such width compared to the width of the groove 32 that the gear 31 in moving to the right of the showing in Figure 2 escapes from gear 20 before the adjacent edge of gear 19 engages gear 20.

By the simple expedient of increasing the area of frictional contact in the friction clutch shown in the preceding applications there has been attained a highly efficient form of synchronizing device which works much more rapidly and with less effort than the single face clutch disclosed in co-pending application, Serial No. 548,237.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. In a gear synchronizing device, the combination with a pair of power gears adapted to be moved to and from an intermeshing position, one of said gears provided with a hub extension, a stop member at the outer end of said extension, said extension between the gear and stop member provided with a keyway, a synchronizer gear having one end rotatably mounted on said stop member and having a hub extension from the other end encircling the hub extension from the power gear, the end of the hub extension from the synchronizer gear having an inturned flange rotatably mounted on the hub extension from the power gear, said synchronizer gear and its hub extension provided with a keyway, a multiple disk friction clutch disposed between the stop member and the inturned flange, alternate disks of said clutch being secured against rotary movement in one of said keyways and the others similarly secured in the other keyway and said synchronizer gear being shiftable axially to cause the clutch to function and thus clutch the synchronizer to the power gear.

2. In a device of the class described, the combination of an axially shiftable power gear provided with a hub extension, a multiple disk friction clutch encircling said extension, a synchronizing gear rotatably mounted on the extension and having a freedom of axial movement thereon, said synchronizer gear provided with a flange constituting the movable clutch jaw of said multiple disk friction clutch, and provided with a pressure receiving face adapted to be engaged by pressure, means for moving the synchronizer gear into clutched engagement with the power gear and to act therethrough for bodily shifting the power gear axially.

3. In a device of the class described, the combination of a power gear provided on one side with a hub extension, a stop member secured to the outer end of the extension, a synchronizer gear mounted for rotary movement on said extension and provided with a hub extension, the synchronizer gear with its hub extension disposed between the power gear and said stop member and having a limited axial movement, said power gear and said synchronizer gear being spaced apart to provide an annular fork receiving groove therebetween and a multiple disk friction clutch between the synchronizer and stop member and lapping a portion of said groove.

4. In a device of the class described, the combination of a gear provided with a sleeve extension projecting from one side thereof, a stop member at the end of the extension opposite the gear, a second gear encircling the extension and with its midlength spaced therefrom to provide a clutch receiving space between the sleeve and second gear, said second gear having a limited axial movement in one direction, said gears being axially spaced apart to provide an annular groove therebetween for containing a shifter fork, and a friction clutch having a plurality of rigid interengaging clutching surfaces disposed in said space for clutching the two gears in driving relation when actuated by the shifter fork.

5. In a device of the class described, the combination of a power gear provided at one end with a hub extension, a multiple disk friction clutch encircling said extension, the disks of said clutch being normally free for a limited axial movement, a synchronizer gear encircling said clutch and having a slight freedom of axial movement, the hub extension of said gear provided with a stop member constituting a relatively fixed clutch jaw for engaging one side of the friction clutch and the synchronizer gear provided with a relatively movable clutch jaw for engaging the opposite side of the friction clutch.

Signed at New York in the county of New York and State of New York this 5th day of August, A. D. 1925.

HOWARD J. MURRAY.